United States Patent Office 2,792,392
Patented May 14, 1957

2,792,392
ORGANIC MERCURY COMPOUNDS

Louis Freedman, Mount Vernon, and Seymour L. Shapiro, Hastings on Hudson, N. Y., assignors to U. S. Vitamin Corporation, New York, N. Y., a corporation of Delaware No Drawing. Application June 10, 1953,
Serial No. 360,825

6 Claims. (Cl. 260—242)

This invention relates to organic mercury compounds which are novel and therapeutically useful, especially as diuretics; and relates more particularly, to such compounds comprising a triazine nucleus having three substituent alkyl radicals each of which is mercuriated.

Mercury compounds prepared by reacting unsaturated alkyl derivatives of various organic compounds with mercuric acetate to form mercuri saturated alkylated derivatives, are well known as having diuretic properties; and the prior art is probably best typified by compounds of the following general formula:

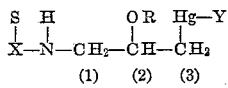

(1)  (2)  (3)

wherein X—NH is usually an acid amide group to which is attached a solubilizing group S; R is a lower alkyl radical; and Y is either OH or an acid radical. The X—NH grouping has not been ascribed as critical in serving the function of diuresis, and has been extensively varied; the S group usually contains a carboxyl which forms water-soluble salts, but other groups which form soluble compounds have been used; and the Y grouping has undergone considerable variation, for example halides, acetates, xanthines, thioglycollates, succinimides, and other non-toxic substituent groupings rendering the prior art compounds more stable have been prepared. Despite all of these variations, the prior art compounds are characterized by a number of disadvantages which limit their usefulness as diuretics. For example, their inherent low solubility requires the incorporation of solubilizing groups which usually render their solutions strongly alkaline, and further reduce their already low mercury content; so that the compound is not too efficient when administered, and larger doses are required.

We have discovered that these and other disadvantages can be overcome by forming the mercury derivatives from a triazine nucleus; our new compounds being primarily tri-mercurated derivatives of Beta alkoxy propyl cyanurate, and which are characterized by the following general formula:

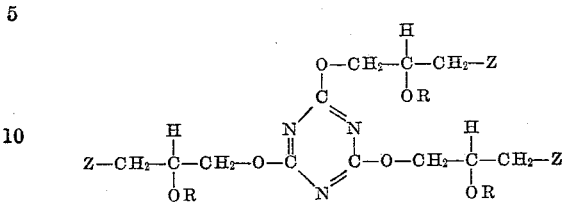

wherein R is a lower alkyl radical, and Z represents Hg attached to a member of the group consisting of OH and a non-toxic substituent group which renders the compound more stable. As will be pointed out later, our preferred groups to be used as substituents attached to the Hg are theophylline or an ortho sulfobenzimide group, which we have found give the final product increased stability when administered either orally or parenterally, as compared to either the hydroxy mercuri compound or to compounds in which the OH is substituted by other nontoxic stabilizing groups.

Our new compounds have a relatively high mercurial content per molecule, as compared to heretofore known and used products, which serves to provide a greater percentage of mercury per unit of active compound; and since they have a relatively high molecular weight they afford a closer approach to isotonicity at therapeutically effective levels for parenteral administration. Furthermore, they are markedly better than the prior art compounds in that our new compounds are soluble in water without the addition of the previously used solubilizing groups, such as carboxyl, which gave the disadvantage of being precipitated in the acid medium of the stomach when taken orally; whereas our compounds are neutral or slightly acid and are readily absorbed and are better tolerated by the gastrointestinal tract when administered orally, and are less irritating and better tolerated when administered parenterally.

Our new compounds are prepared by reacting triallyl cyanurate with mercuric acetate in the presence of a lower aliphatic alcohol to form the tri-mercuri alkoxy acetate of tri-propyl cyanurate, and converting the latter, by treatment with an alkali hydroxide, to the soluble hydroxy derivative, according to the following graphic equation in which R is preferably methyl but may be ethyl or other suitable lower alkyl radical:

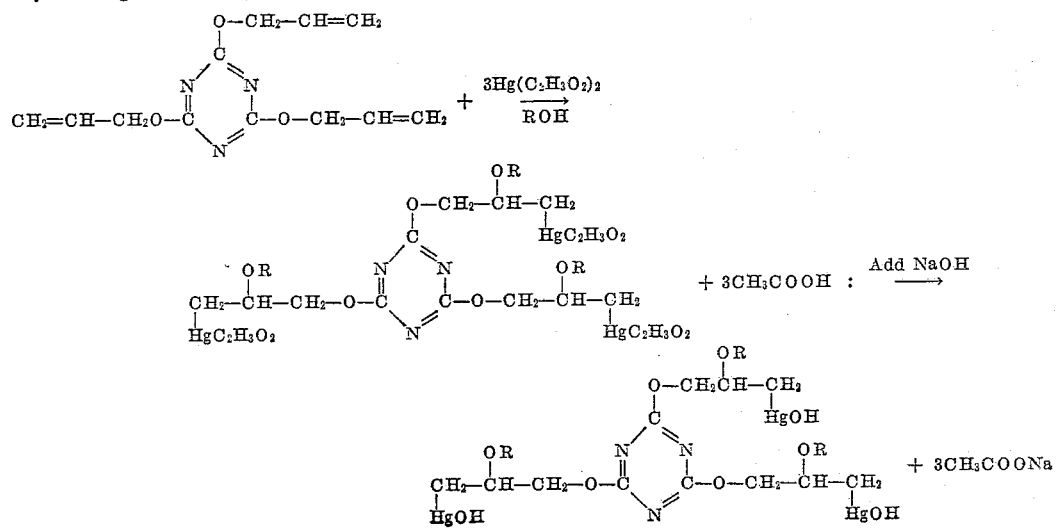

The following examples will serve further to explain our invention but are to be interpreted as illustrative of the invention, the scope of which will be defined in the claims hereof:

EXAMPLE 1

A solution of 20.0 g. of crystalline tri-allyl cyanurate (0.08 mole) in 250 ml. of methanol was stirred while treated portionwise with 76.5 g. (0.24 mole) of mercuric acetate, and allowed to stand overnight. Then to the clear solution was added a solution of sodium hydroxide in methanol to slight alkalinity forming the mercuri hydroxy compound as a white precipitate. This precipitate was collected by filtration, in yield of 34 g. Concentration of the methanol filtrate afforded an additional 43.5 g., for a total of 77.5 g. (or 97.5% of theoretical) yield of tri-(3 hydroxy mercuri 2 methoxy propyl) cyanurate. This compound melted at 225° C. with decomposition, and was readily soluble in water giving a solution having a neutral or slightly acid reaction. When administered intraperitoneally, 30 mg. per kg., in mice the compound showed marked diuretic activity as shown in Table 1, following.

EXAMPLE 2

A solution of 10.0 g. of crystalline tri-allyl cyanurate (0.04 mole) in 100 ml. of methanol was stirred while treated portionwise with 38.24 g. (0.12 mole) of mercuric acetate and the clear solution was allowed to stand for 92 hours. A solution of sodium hydroxide in 15 ml. of water was added to convert the mercuri acetate compound to the hydroxy compound, the mixture was vigorously stirred, treated with 150 ml. of acetone, and filtered. The white product was washed with acetone, then ethanol, and was dried in a vacuum desiccator over phosphorus pentoxide; giving a yield of 34.4 g. (86.6% of theoretical) of a compound identical with that obtained in Example 1.

EXAMPLE 3

A solution of 20.0 g. of tri-allyl cyanurate (crystalline) (0.08 mole) in 250 ml. of ethanol was stirred while treated portionwise with 76.5 g. (0.24 mole) of mercuric acetate, and the clear solution was allowed to stand over night. To this solution was then added a solution of sodium hydroxide in 100 ml. of ethanol. The white precipitate formed was collected by filtration, with a yield of 40.3 g. (50.7% of theoretical). This product was tri-(3 hydroxy mercuri 2 ethoxy propyl) cyanurate, a white powder which melted at 250–280° C. with decomposition starting at 160° C.

In the above Examples 1 to 3, we have illustrated our invention with respect to the hydroxy mercuri compounds in which the Hg is attached to OH at the positions designated as "Z" in the general formula given above. In the following Examples 4 to 6, we illustrate our invention with respect to our new compounds in which those hydroxyl groups are replaced by non-toxic organic substituent groups which render the compound more stable; the said substituent groups being attached to the Hg in place of the OH at the positions designated as "Z" in said formula. Such substituted compounds are especially effective diuretic agents in both oral and parenteral use.

EXAMPLE 4

To a warmed solution of 3.2 g. (.018 mole) of theophylline in 200 ml. water was added 6.0 g. (.006 mole) of tri-(3 hydroxy mercuri 2 methoxy propyl) cyanurate, prepared as in Example 1. The clear solution was allowed to stand over night, and was then stripped of the water at reduced pressure. The residue which remained was dried in a vacuum desiccator over phosphorus pentoxide, and a yield of 8.0 g. (90% of theoretical) of a white powder was obtained, which gave a melting point of 194–220° C. with decomposition. This product, tri-(3 theophylline mercuri 2 methoxy propyl) cyanurate, when analyzed gave carbon 29.06%, hydrogen 3.44%, and nitrogen 14.4%, as against 29.2%, 3.04%, and 14.2% respectively, the theoretical for the compound $C_{36}H_{45}N_{15}O_{12}Hg_3$.

This product of Example 4 was soluble in water to give solutions having a neutral to slightly acid reaction, and when administered intraperitoneally, 30 mg. and 10 mg. per kg. in mice, it showed marked diuretic activity at both levels as shown in Table 1. On oral administration, the compound also showed good diuretic activity at levels ranging from 18 to 8 mg. per kg. of weight of the rats tested. Table 2, which follows Table 1, gives the diuretic index of this compound, determined by dividing the percent of urinary excretion of the animals on the test compound by the percent of urinary excretion of the animals on a physiologic saline control run simultaneously (method of Lipschitz). For comparison, the table also gives the diuretic index of a known diuretic compound of established activity, and urea with corresponding simultaneous controls.

Table 1

Tabulated results of diuretic activity of compounds described in Examples 1 and 4 respectively. Intraperitoneal injection in mice according to method of Greiner J. Pharm. and Expt. Therap. 103–431, 1951, wherein weight loss subsequent to administration of mercurial, reflects diuretic efficiency. Each value represents the average results using three mice.

|  | Level, mg. Hg | Percent of weight loss as water not restored | |
|---|---|---|---|
|  |  | After 4 hrs. | After 8 hrs. |
| Compound of Example 1 | 30 | 42.0 | 47.4 |
| Compound of Example 4 | 30 | 48.0 | 50.6 |
| Do | 10 | 45.5 | 28.0 |
| Control (no mercurial) |  | 18.2 | 10.4 |

Table 2.—*Diuretic index comparison*

| Compound | Experimental Group | Level, mg./kg. | Diuretic Index | | |
|---|---|---|---|---|---|
|  |  |  | 1 hr. | 2 hrs. | 3 hrs. |
| Example 4 | 1–12 rats | 12 | 5.1 | 2.14 | 1.43 |
| Do | 2–12 rats | 12 | 7.4 | 1.85 | 1.60 |
| Mercurophyllin U. S. P. | 12 rats | 12 | 1.93 | 1.33 | 1.12 |
| Urea | do | 1,500 | 1.47 | 1.44 | 1.44 |

EXAMPLE 5

To a warm solution of 9.95 g. (.01 mole) of tri-(3 hydroxy mercuri 2 ethoxy propyl) cyanurate in 312 ml. water was added 5.4 g. (.03 mole) of theophylline. The solution was stirred and allowed to stand for thirty minutes and filtered from a small amount of gummy material. The clear solution was allowed to stand overnight and then stripped of the water under reduced pressure. The residue which remained was collected and dried in a vacuum desiccator over phosphorus pentoxide. A yield of 12.6 g. (84.4% of theory) in the form of a white powder, was obtained. The product tri-(3 theophylline mercuri 2 ethoxy propyl) cyanurate melted at 250° C. with decomposition beginning at 195° C. Analysis of nitrogen gave N=13.53%. Theory for $C_{39}H_{51}N_{15}O_{12}Hg_3$ is N=13.8%. This product, somewhat less soluble in water than the corresponding methoxy derivative of Example 4, gives a slightly acid to neutral solution.

EXAMPLE 6

To a hot solution 1.66 g. (.00906 mole) of ortho sulfo benzimide in 50 ml. of methanol was added a solution of 3 g. (.00302 mole) of tri-(3 hydroxy mercuri 2 methoxy propyl) cyanurate, and the solution allowed to stand for 70 hours. The solvent was stripped under reduced pressure and then 150 ml. of benzene was added and distilled off, azeotroping the residual moisture from the product.

The white powder was collected and dried in a vacuum desiccator over phosphorus pentoxide, yielding 3.4 g. (76.3%) of tri-(3 o-sulfo benzimide mercuri 2 methoxyl propyl) cyanurate. M. P. 210–225 with decomposition.

This product is less soluble in water than the theophylline derivative of Example 4 and gives a slightly acid solution of pH 5.5 to 6.0.

Having described our invention, what we claim is:

1. New organic mercury compounds which are water soluble and useful as diuretics, and which are of the general formula

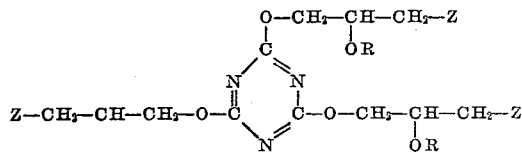

wherein R is a member of the group consisting of methyl and ethyl, and in which Z represents Hg attached to a member of the group consisting of OH, theophylline and ortho-sulfo-benzimide.

2. The compound tri-(3-hydroxymercuri-2-methoxypropyl) cyanurate.

3. The compound tri - (3 - hydroxymercuri - 2-ethoxypropyl) cyanurate.

4. The compound tri - (3 - theophyllinomercuri - 2-methoxypropyl) cyanurate.

5. The compound tri - (3 - theophyllinomercuri - 2-ethoxypropyl) cyanurate.

6. The compound tri-(3-[o-sulfobenzimido]mercuri-2-methoxypropyl) cyanurate.

References Cited in the file of this patent
UNITED STATES PATENTS
2,576,349    Lehman _____ Nov. 27, 1951
OTHER REFERENCES
Dominikiewica: "Chem. Abst." (1936). vol. 30. p. 1030.